United States Patent
Schumacher

(10) Patent No.: US 7,385,532 B1
(45) Date of Patent: Jun. 10, 2008

(54) EXTENDED BITSTREAM AND GENERATION THEREOF FOR DYNAMICALLY CONFIGURING A DECODER

(75) Inventor: Paul R. Schumacher, Berthoud, CO (US)

(73) Assignee: Xilinx, Inc., San Jose, CA (US)

( * ) Notice: Subject to any disclaimer, the term of this patent is extended or adjusted under 35 U.S.C. 154(b) by 0 days.

(21) Appl. No.: 11/707,616

(22) Filed: Feb. 16, 2007

(51) Int. Cl.
*H03M 7/38* (2006.01)
*H03M 7/34* (2006.01)

(52) U.S. Cl. .............................. 341/51; 341/106; 341/1

(58) Field of Classification Search ................. 341/50, 341/51, 106; 704/1, 100, 500
See application file for complete search history.

(56) References Cited

U.S. PATENT DOCUMENTS

| | | | |
|---|---|---|---|
| 6,366,224 B2 * | 4/2002 | Cliff et al. ..................... 341/78 |
| 7,028,283 B1 | 4/2006 | Keller et al. |
| 7,262,719 B2 * | 8/2007 | Rijavec ....................... 341/65 |
| 2007/0043575 A1 * | 2/2007 | Onuma et al. .............. 704/500 |
| 2008/0021712 A1 * | 1/2008 | Fejzo .......................... 704/500 |

OTHER PUBLICATIONS

Xilinx, Inc., U.S. Appl. No. 11/433,126 by Schumacher et al. filed May 12, 2006.

* cited by examiner

*Primary Examiner*—Peguy JeanPierre
(74) *Attorney, Agent, or Firm*—W. Eric Webostad; Lois D. Cartier

(57) ABSTRACT

An extended bitstream, and generation thereof, for dynamically configuring a decoder. Content data is obtained to be encoded. Build settings are obtained for configuring the decoder. The content data is encoded with an encoder to provide encoded data. A configuration bitstream is generated for configuring programmable logic responsive to the build settings. The configuration bitstream is combined with the encoded data to provide the extended bitstream. The extended bitstream is self-contained to allow for configuring of the programmable logic to dynamically instantiate the decoder to decode the encoded data.

20 Claims, 4 Drawing Sheets

EXTENDED BITSTREAM AND GENERATION THEREOF FOR DYNAMICALLY CONFIGURING A DECODER

FIELD OF THE INVENTION

One or more aspects of the invention relate generally to integrated circuits and, more particularly, to an extended bitstream, and generation thereof, for dynamically configuring a decoder in an integrated circuit.

BACKGROUND

Programmable logic devices ("PLDs") are a well-known type of integrated circuit that can be programmed to perform specified logic functions. One type of PLD, the field programmable gate array ("FPGA"), typically includes an array of programmable tiles. These programmable tiles can include, for example, input/output blocks ("IOBs"), configurable logic blocks ("CLBs"), dedicated random access memory blocks ("BRAMs"), multipliers, digital signal processing blocks ("DSPs"), processors, clock managers, delay lock loops ("DLLs"), and so forth. Notably, as used herein, "include" and "including" mean including without limitation.

One such FPGA is the Xilinx Virtex® FPGA available from Xilinx, Inc., 2100 Logic Drive, San Jose, Calif. 95124. Another type of PLD is the Complex Programmable Logic Device ("CPLD"). A CPLD includes two or more "function blocks" connected together and to input/output ("I/O") resources by an interconnect switch matrix. Each function block of the CPLD includes a two-level AND/OR structure similar to those used in Programmable Logic Arrays ("PLAs") and Programmable Array Logic ("PAL") devices. Other PLDs are programmed by applying a processing layer, such as a metal layer, that programmably interconnects the various elements on the device. These PLDs are known as mask programmable devices. PLDs can also be implemented in other ways, for example, using fuse or antifuse technology. The terms "PLD" and "programmable logic device" include but are not limited to these exemplary devices, as well as encompassing devices that are only partially programmable.

For purposes of clarity, FPGAs are described below though other types of PLDs may be used. FPGAs may include one or more embedded microprocessors. For example, a microprocessor may be located in an area reserved for it, generally referred to as a "processor block."

FPGAs are suited for implementing circuits to process various types of content, such as video data, audio data, image data, or a combination of one or more thereof, namely multimedia data. With these various forms of data, there are various forms of encoding that may be used. Accordingly, a decoder is configured to support the type of encoding used, which generally limits the type of encoding to a standard form. For example, with respect to video data, use of Motion Picture Experts Group ("MPEG") types of encoding, and thus decoding, is ubiquitous as a commonly used platform for encoding and decoding of video data.

Heretofore, a designer would not depart from a commonly used standard form of encoding data, as encoders and decoders, including coder/decoders ("CODECs"), would have to be manufactured to be compatible with such deviation. Conventionally, however, hardware has been manufactured to operate using known standard types of encoding and decoding. This is because data or content is conventionally encoded to a known standard, and manufacturing hardware to support known standards allows such content to be used on various hardware platforms supporting such known standards.

In other instances for example, CODECs are implemented as software; however, such software CODECs generally are slower than their hardware counterparts. Special purpose CODECs, whether in software or hardware or a combination thereof, have been manufactured. But, in these instances, content created using such special purpose CODECs is generally only usable with such special purpose platforms.

Continuing the example of video content, there are many areas where content may be enhanced beyond that available using a standard form of encoding. For example, there are many factors in producing video content, including the type of motion compensation, the type of motion estimation, the parameters used for transform from frequency to time domain, the parameters used for inverse transform from time to frequency domain, the resolution, the various types of filtering, and so on.

The latest trend in video coding is to provide various forms of scalability, sometimes all embodied within the same video bitstream. Typically, this data is provided in the form of a "base layer," as well as one or more "enhancement layers." A CODEC system would thus need to be capable of creating a valid video output using just the base layer or the base layer and any combination of the enhancement layers. Exemplary types of scalability provided in the enhancement layers include: temporal scalability (e.g., frame rate), quality scalability (e.g., often measured by peak signal-to-noise ratio), and resolution scalability (e.g., frame size). An example of this type of CODEC is embodied in the scalable video coding ("SVC") development work currently ongoing. SVC is an extension to the MPEG-4 Advanced Video Coding (AVC) standard (also known as MPEG-4, Part 10) jointly developed by the International Organization for Standardization (ISO) and International Telecommunication Union (ITU-T). The MPEG-4 AVC standard is published as ITU-T H.264 and ISO/IEC 14496-10.

The proposed SVC CODEC provides all three of the aforementioned types of scalability (e.g., temporal, quality, and resolution) in labeled packets within the same bitstream. Either a smart network can be used to decide which types of packets to send to a particular end-user, or the end-user can receive the entire bitstream and only decode the packets for which he or she has the capability and authorization to decode. However, even with an SVC CODEC, an upper limit is in place, as only MPEG-approved enhancement layers are supported.

Accordingly, it would be desirable and useful to provide means that allows for use of standards-based encoding and decoding, but also allows for content to be encoded and decoded using a customized solution that is less platform dependent.

SUMMARY

One or more aspects of the invention generally relate to integrated circuits and, more particularly, to an extended bitstream, and generation thereof, for dynamically configuring a decoder in an integrated circuit.

An aspect of the invention relates generally to a method for providing an extended bitstream for dynamically configuring a decoder. Content data is obtained to be encoded. Build settings are obtained for configuring the decoder. The content data is encoded with an encoder to provide encoded data. A configuration bitstream is generated for configuring programmable logic responsive to the build settings. The configuration bitstream is combined with the encoded data to provide the extended bitstream. The extended bitstream is self-contained to allow for configuring of the programmable logic to dynamically configure the decoder to decode the encoded data.

Another aspect of the invention relates generally to a method for on-demand providing of content. At least one first tool is selected from a first library. Content is encoded to provide encoded content, the encoding including use of the at least one first tool selected. A bitstream is generated having configuration information for configuring programmable logic to decode the encoded content, the configuration information including at least a reference to the at least one first tool selected. The bitstream is sent over a network to a user system, the user system including an integrated circuit having the programmable logic. At least one second tool, which is a duplicate of the at least one first tool, is selected from a second library as accessed by the integrated circuit. A decoder instantiated in the programmable logic is at least partially reconfigured responsive to the at least one second tool selected. The decoder is used to decode the encoded content.

Yet another aspect of the invention relates generally to a method for on-demand providing of content. Content is encoded to provide encoded content, the encoding including use of the encoding settings. Build settings are obtained for instantiating a decoder at least in part in programmable logic, the build settings being for the encoding settings. A configuration bitstream is generated for configuring the programmable logic responsive to the build settings. The configuration bitstream is sent over a network to a user system, the user system including an integrated circuit having the programmable logic. A decoder instantiated in the programmable logic is at least partially reconfigured responsive to the configuration bitstream. The decoder is used to decode the encoded content.

BRIEF DESCRIPTION OF THE DRAWINGS

Accompanying drawings show exemplary embodiments in accordance with one or more aspects of the invention. However, the accompanying drawings should not be taken to limit the invention to the embodiments shown, but are for explanation and understanding only.

DETAILED DESCRIPTION OF THE DRAWINGS

In the following description, numerous specific details are set forth to provide a more thorough description of the specific embodiments of the invention. It should be apparent, however, to one skilled in the art, that the invention may be practiced without all the specific details given below. In other instances, well known features have not been described in detail so as not to obscure the invention. For ease of illustration, the same number labels are used in different diagrams to refer to the same items; however, in alternative embodiments the items may be different.

Figure 1:
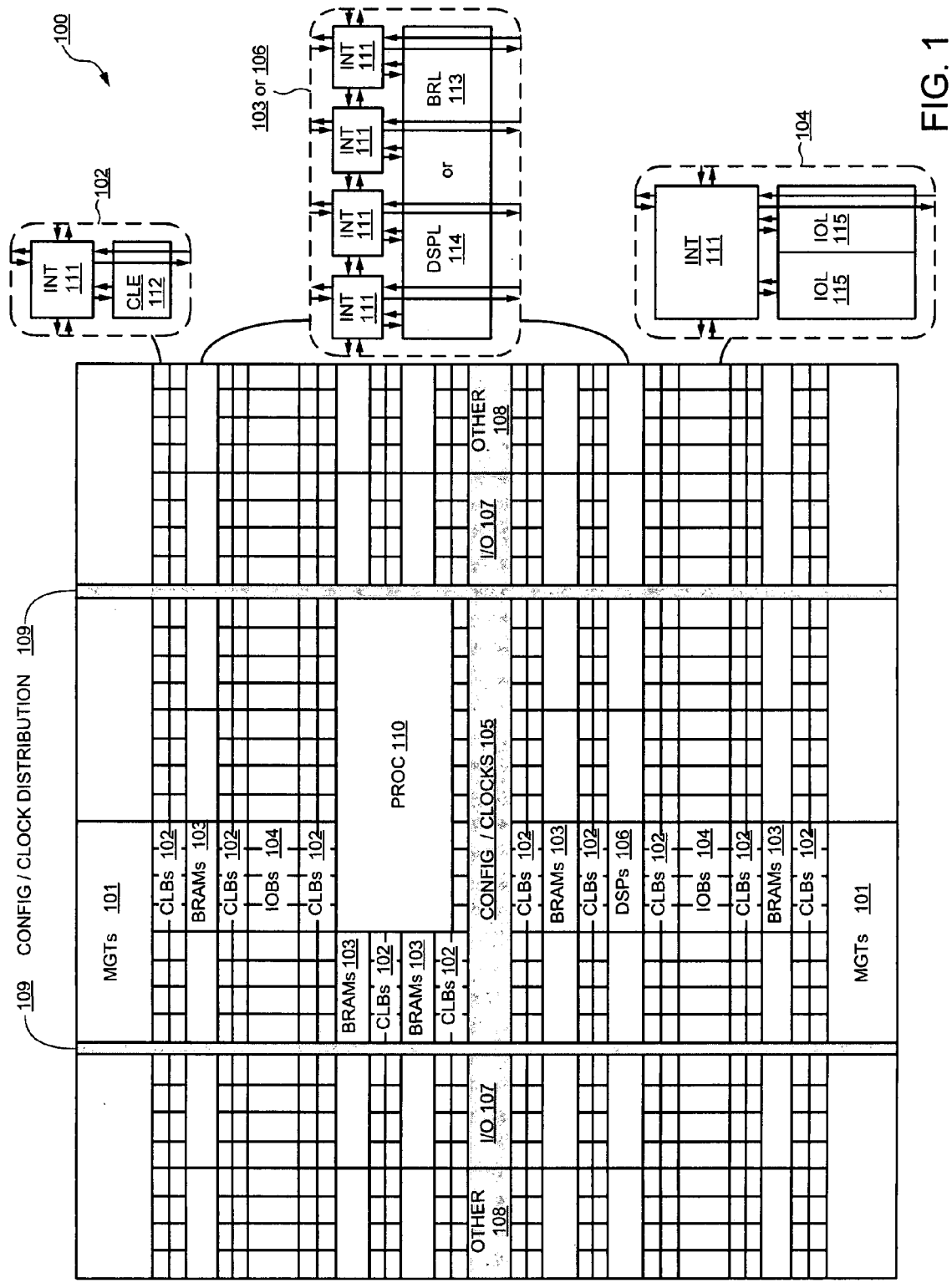
FIG. 1 is a simplified block diagram depicting an exemplary embodiment of a columnar Field Programmable Gate Array ("FPGA") architecture in which one or more aspects of the invention may be implemented.

FIG. 1 illustrates an FPGA architecture 100 that includes a large number of different programmable tiles including multi-gigabit transceivers ("MGTs") 101, configurable logic blocks ("CLBs") 102, random access memory blocks ("BRAMs") 103, input/output blocks ("IOBs") 104, configuration and clocking logic ("CONFIG/CLOCKS") 105, digital signal processing blocks ("DSPs") 106, specialized input/output ports ("I/O") 107 (e.g., configuration ports and clock ports), and other programmable logic 108 such as digital clock managers, analog-to-digital converters, system monitoring logic, and so forth. Some FPGAs also include dedicated processor blocks ("PROC") 110.

In some FPGAs, each programmable tile includes a programmable interconnect element ("INT") 111 having standardized connections to and from a corresponding interconnect element 111 in each adjacent tile. Therefore, the programmable interconnect elements 111 taken together implement the programmable interconnect structure for the illustrated FPGA. Each programmable interconnect element 111 also includes the connections to and from any other programmable logic element(s) within the same tile, as shown by the examples included at the right side of FIG. 1.

For example, a CLB 102 can include a configurable logic element ("CLE") 112 that can be programmed to implement user logic plus a single programmable interconnect element 111. A BRAM 103 can include a BRAM logic element ("BRL") 113 in addition to one or more programmable interconnect elements 111. Typically, the number of interconnect elements included in a tile depends on the height of the tile. In the pictured embodiment, a BRAM tile has the same height as four CLBs, but other numbers (e.g., five) can also be used. A DSP tile 106 can include a DSP logic element ("DSPL") 114 in addition to an appropriate number of programmable interconnect elements 111. An IOB 104 can include, for example, two instances of an input/output logic element ("IOL") 115 in addition to one instance of the programmable interconnect element 111. As will be clear to those of skill in the art, the actual I/O pads connected, for example, to the I/O logic element 115 are manufactured using metal layered above the various illustrated logic blocks, and typically are not confined to the area of the I/O logic element 115.

In the pictured embodiment, a columnar area near the center of the die (shown shaded in FIG. 1) is used for configuration, I/O, clock, and other control logic. Vertical areas 109 extending from this column are used to distribute the clocks and configuration signals across the breadth of the FPGA.

Some FPGAs utilizing the architecture illustrated in FIG. 1 include additional logic blocks that disrupt the regular columnar structure making up a large part of the FPGA. The additional logic blocks can be programmable blocks and/or dedicated logic. For example, the processor block 110 shown in FIG. 1 spans several columns of CLBs and BRAMs.

Note that FIG. 1 is intended to illustrate only an exemplary FPGA architecture. The numbers of logic blocks in a column, the relative widths of the columns, the number and order of columns, the types of logic blocks included in the columns, the relative sizes of the logic blocks, and the interconnect/logic implementations included at the right side of FIG. 1 are purely exemplary. For example, in an actual FPGA more than one adjacent column of CLBs is typically included wherever the CLBs appear, to facilitate the efficient implementation of user logic. FPGA 100 illustratively represents a columnar architecture, though FPGAs of other architectures, such as ring architectures for example, may be used. FPGA 100 may be a Virtex-4™ or Virtex-5™ FPGA from Xilinx of San Jose, Calif.

Figure 2:
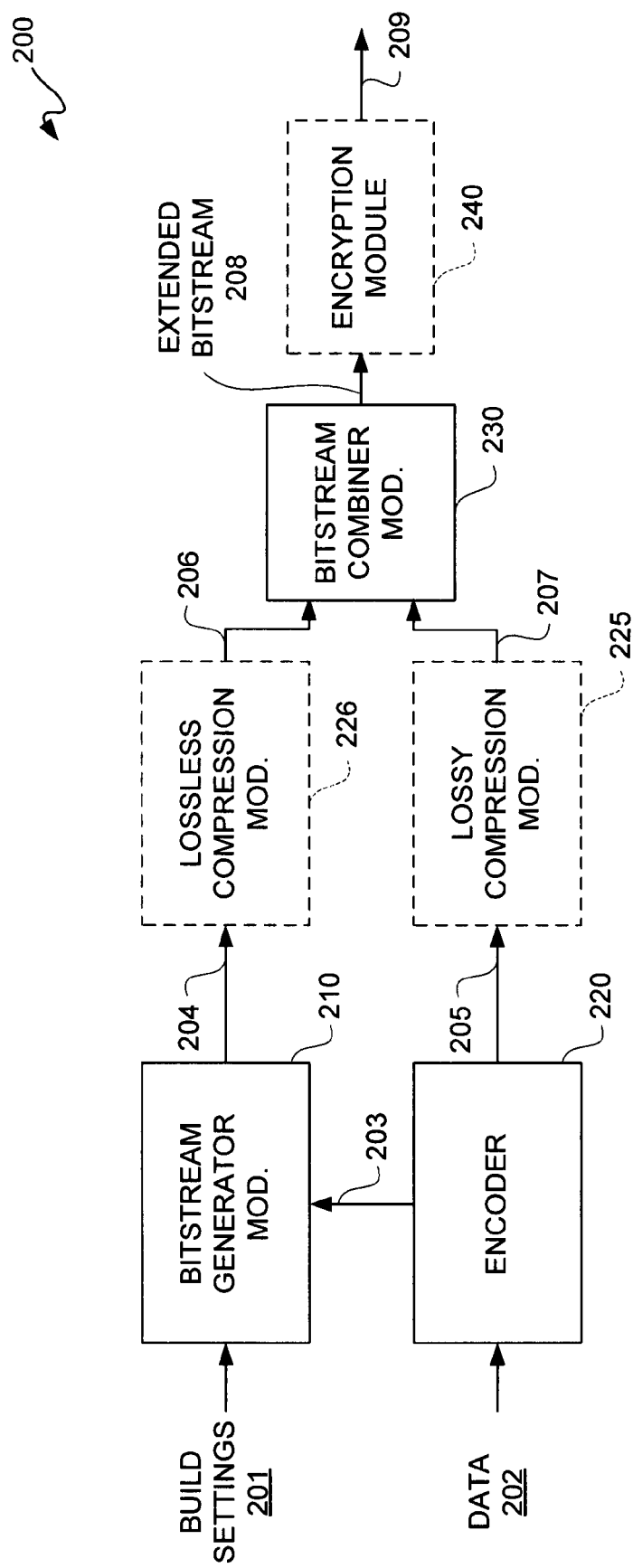
FIG. 2 is a block diagram depicting an exemplary embodiment of a bitstream generation system.

FIG. 2 is a block diagram depicting an exemplary embodiment of a bitstream generation system 200. Bitstream generation system 200 includes bitstream generator module 210, encoder 220, and bitstream combiner module 230. Bitstream generation system 200 may optionally include one or more of lossless compression module 226, lossy compression module 225, and encryption module 240.

Content data 202 is provided to encoder 220. Content data may be any of a variety of known types of content, including video, audio, images, pictures, or a combination of one or more thereof as in a multimedia application. Furthermore, it should be appreciated that content data 202 may include code, such as HTML, for web page applications. For purposes of clarity by way of example and not limitation, the example of MPEG video encoding is used; however, it should be appreciated that any of a variety of known types of encoding for video, audio, images, pictures, and the like may be used. Additionally, rather than having only a standards-based encoder 220, encoder 220 may be customized. Thus, encoder 220 may include one or more features not in the feature set of a known standard type of encoding, such as MPEG.

Along those lines, MPEG has a proposed Reconfigurable Video Coding ("RVC") framework to offer access to a standard library of video coding tools standardized by MPEG. These MPEG video coding tools are initially to be drawn from existing MPEG video coding standards, with the capacity to add new video coding tools to the library approved by MPEG. While the following description may be used for RVC, it is not limited to an RVC application. As shall be appreciated from the following description, the user need not be limited to an MPEG library for encoding data 202 or to standards-based encoding, but may implement an entirely customized encoding scheme, or a combination of a standards-based and customized encoding scheme.

Depending on the type of parameters and type of encoding used, decoder circuitry may be used to decode encoded data. Accordingly, build settings 201 may be provided to a bitstream generator module 210. Bitstream generator module 210 may be configured to generate a configuration bitstream 204. Encoder 220 may be configured to generate encoded data 205. Configuration bitstream 204 may be combined with encoded data 205 by bitstream combiner module 230. Build settings 201 reflect the type of decoding to be used for complementing the encoding employed by encoder 220. Along those lines, encoder 220 may provide a configuration information signal 203 to bitstream generator module 210.

Notably, there are many known software programs for generating a configuration bitstream based on parameterizable input. Examples of such software tools include ISE from Xilinx. and Quartus from Altera for providing a complete configuration bitstream to configure an FPGA. For a partial bitstream, examples of such software tools include JPG, PARBIT, and PlanAhead from Xilinx. Additionally, it should be appreciated that for configuring known circuitry, the location to which configuration bitstream 204 is to be written may be specified. For example, for an FPGA, slots associated with blocks of a decoder module may be identified. These slots indicate areas of programmable logic of an FPGA in which functions of a decoder may be implemented. By knowing which slots can be configured, partial reconfiguration may be used. Thus, it should be appreciated that configuration bitstream 204 may be for complete or partial reconfiguration of a decoder.

Additionally, it should be appreciated that build settings 201 are not limited to settings for a decoder strictly limited to the features of encoder 220, but may reflect the type of content of data 202, as well as the integrated circuit in which a decoder is implemented in whole or in part in programmable logic. With respect to the latter, a variety of extended bitstreams 208 may be generated by bitstream combiner module 230 to accommodate various types of integrated circuit platforms, from which a user may select an extended bitstream corresponding to their platform. Thus, for example a family of FPGAs may constitute one platform. Furthermore, authorization level may be part of build settings 201. Those are merely two examples of content-independent parameters that may be included in build settings 201; however, other known examples of content-independent parameters for a decoder may be used. With respect to content data 202, scalability of such data may be a factor. For example, video data may be displayed on a large HDTV, or a cell phone. Thus, the scale in which content is provided may be used as a factor in generating a configuration bitstream 204. Enhancement layers may affect temporal scalability, quality scalability, and resolution scalability. Accordingly, responsive to build settings 201, bitstream generator module 210 may be configured to provide a configuration bitstream 204 which is associated with one or more of these types of scalabilities for purposes of instantiating or reconfiguring a decoder in programmable logic. Moreover, as indicated with respect to RVC, library tools selected for use by encoder 220 may be incorporated by bitstream generator module 210 responsive to build settings 201 for generating configuration bitstream 204 for purposes of instantiating a decoder capable of decoding content data 202 so encoded with such one or more tools. There are a couple of approaches to performing RVC: 1) have a predetermined library of tools/modules which both the encoder and decoder know a priori; or 2) assume a more custom approach where the decoder is effectively a "blank slate" and only the encoder portion has access to the tools in the library. For the former, the tool number(s) for those in the library may be sent for configuring the decoder dynamically. For the latter, all modules may be assumed to be "custom" and the bitstream generator would send the bitstream(s), whether they are "custom" generated or pulled from a memory, for configuring the decoder dynamically.

Optionally, configuration bitstream 204 may be provided to lossless compression module 226. It should be appreciated that for a configuration bitstream, it is generally necessary that all values be returned to their original state for configuring an FPGA. This additionally may involve a certain amount of error correction capability, and as error correction capability is well known, it is not described herein in unnecessary detail. Output of lossless compression module 226 is compressed configuration bitstream 206. For purposes of clarity by way of example and not limitation, it shall be assumed that lossless compression module 226 is employed.

Additionally, an optional lossy compression module 225 may be used for compressing encoded data 205. While a lossy compression module is optionally shown, it should be appreciated that encoded data may be compressed using a lossless compression; conventionally, however, lossy compression is used for encoded data. For purposes of clarity by way of example and not limitation, it shall be assumed that lossy compression module 225 is used to provide compressed encoded data 207.

Compressed configuration bitstream 206 and compressed encoded data 207 may be combined into a single bitstream by bitstream combiner module 230. Configuration information and encoded data may be combined for sending over a same channel. However, it should be appreciated that compressed configuration bitstream 206 and compressed encoded data 207 may only be maintained in association with one another, and thus they need not be transmitted over the same communication channel. For purposes of clarity by way of example and not limitation, it shall be assumed that communication over a single channel is used, and thus bitstream combiner module 230 is used to provide an extended bitstream 208 including in this example compressed configuration bitstream 206 and compressed encoded data 207.

Extended bitstream 208 may optionally be provided to encryption module 240 for providing an encrypted extended bitstream 209. Again, for purposes of clarity and not limitation it shall be assumed that encryption module 240 is employed. Encryption is assumed as for this example of a complete self-contained extended bitstream, encoded data and configuration information, is being sent, namely both what to decode and how to decode it.

At this point, it should be appreciated that extended bitstream 208 may be used to dynamically configure or reconfigure a decoder instantiated in part or in whole in programmable logic of an FPGA. Thus, by having an association of the configuration bitstream with the encoded data, such extended bitstream is self-contained. In other words, such self-contained bitstream may be for a standards-based encoding or a non-standards-based encoding, or a combination of a standards-based encoding and a non-standards-based encoding. Furthermore, because an FPGA is a form of Application Specific Standard Product ("ASSP"), there may be any of a variety of different types of FPGAs that may be implemented for providing a decoder instantiated at least in part in programmable logic. Thus, this facilitates platform independence with respect to the implementation of a decoder. Notably, although the example of an FPGA is used, it should be appreciated that other types of integrated circuits having programmable logic may be used.

Use of hardware libraries for programmable logic devices is known, as described in U.S. Pat. No. 7,028,283. Furthermore, use of slots for scalable content coding, including partial reconfiguration, is described in a co-pending patent application entitled "Method and Apparatus for Processing Scalable Content", by Schumacher et al., U.S. patent application Ser. No. 11/433,126, filed on May 12, 2006, which is incorporated by reference herein in its entirety.

Figure 3:
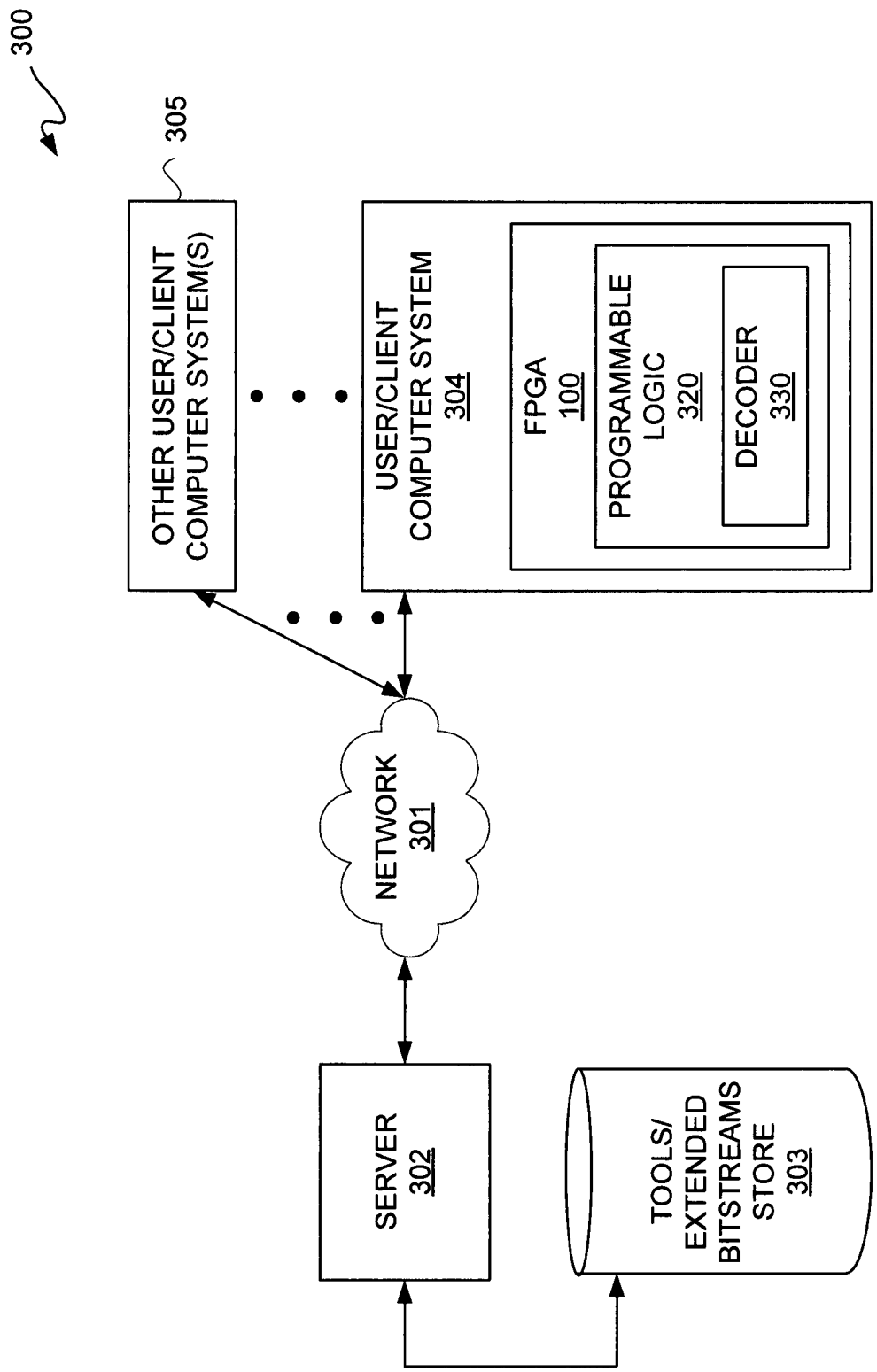
FIG. 3 is a block diagram depicting an exemplary embodiment of an information system.

FIG. 3 is a block diagram depicting an exemplary embodiment of an information system 300. Information system 300 includes network 301, server 302, extended bitstreams store 303, and user/client computer systems 304 and 305. Tools/extended bitstreams store 303 may be used to store a plurality of tools and extended bitstreams, such as for example extended bitstreams 208, generated using a bitstream generation system, such as bitstream generation system 200 of FIG. 2. Notably, although use of a single user/client computer system 304 is described, it should be appreciated that other user/client computer systems 305 may be coupled to network 301 for accessing one or more extended bitstreams in extended bitstreams store 303. Additionally, network 301 may be configured to support live-feed video, audio, and/or multimedia. Notably, there may be some delay as encoder 220 of FIG. 2 may encode content in real-time for decoder 330, and thus some buffering may be used. Further, one or more extended bitstreams of extended bitstreams store 303 in such an embodiment may not have encoded content, but may rather only have encoded configuration information for dynamically instantiating all or part of decoder 330. Furthermore, one or more tools of store 303 may be selected for real-time encoding of content.

As described above with reference to FIG. 2, each of the extended bitstreams in extended bitstreams store 303 may be self-contained such that a user, such as a user/client computer system 304, may be used to access a server 302 via network 301 to select an extended bitstream from extended bitstreams store 303. Such extended bitstream from extended bitstreams store 303 may be provided via network 301 to user/client computer system 304 for programming or reconfiguring a decoder 330 instantiated at least in part or in whole in programmable logic 320 of an integrated circuit, such as FPGA 100. User/client computer system 304 may include FPGA 100, as illustratively shown in FIG. 3 for purposes of example but not limitation, or at least have access to FPGA 100 for providing an extended bitstream from extended bitstreams store 303 to programmable logic 320 for configuring or reconfiguring decoder 330.

Figure 4:
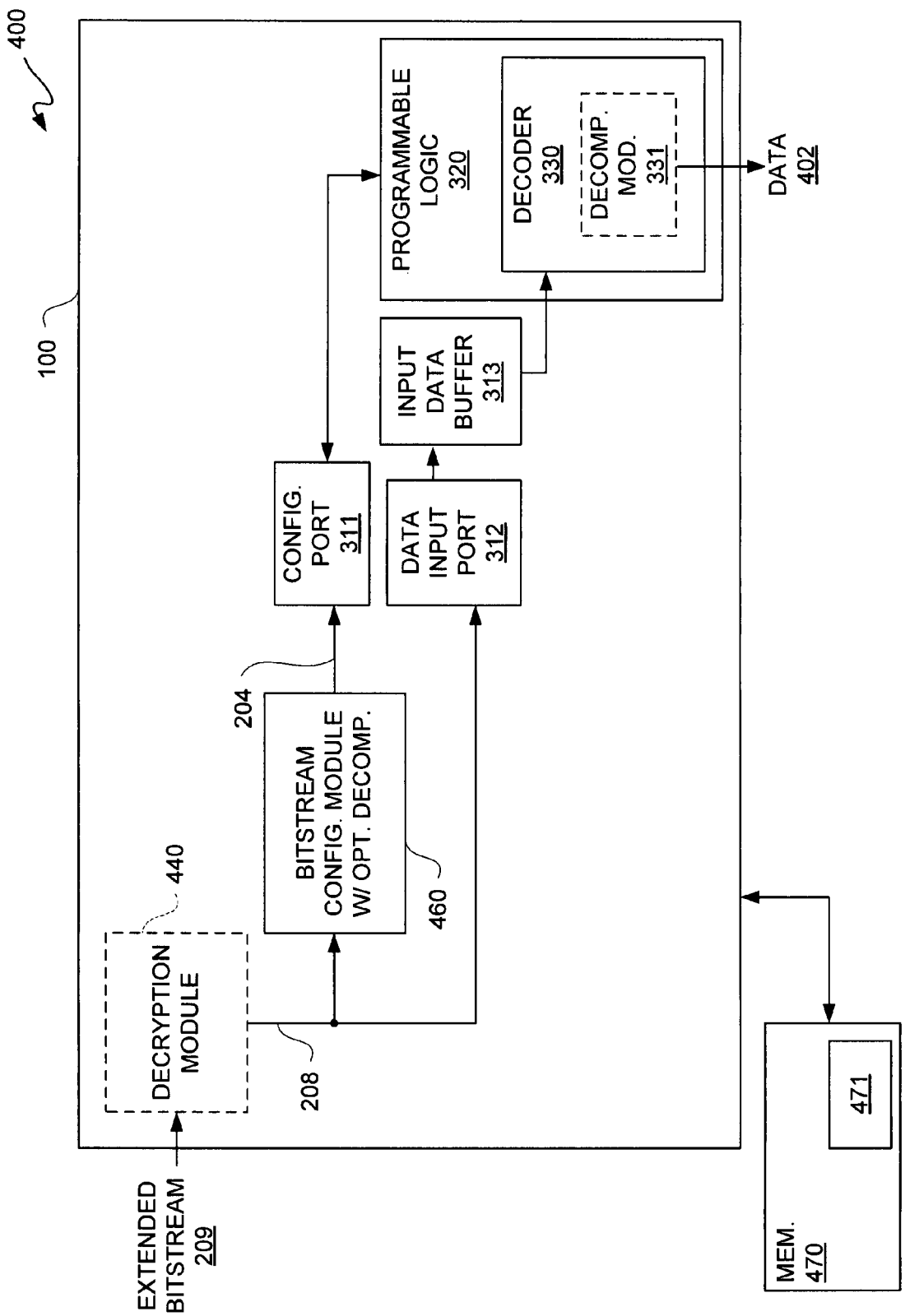
FIG. 4 is a block diagram depicting an exemplary embodiment of a decoder system.

FIG. 4 is a block diagram depicting an exemplary embodiment of a decoder system 400. With reference to FIG. 4 and renewed reference to FIGS. 2 and 3, decoder system 400 is further described. System 400 may be on a single integrated circuit chip, for example, such as a single FPGA 100. Thus, optional decryption module 440, as well as configuration module 460. Alternatively, one or more of optional decryption module 440 and configuration module 460 may be off-chip with respect to FPGA 100, such as for full system configuration of FPGA 100 instead of using partial reconfiguration using an extended bitstream as described herein. However, for purposes of clarity by way of example and not limitation, it shall be assumed that partial reconfiguration is used. Notably, a separate off-chip memory 470 which stores an initial configuration bitstream 471, such as all components except for or including a base version of decoder 330, may be used to initially configure FPGA 100. Additionally, configuration bitstream 471 may include an optional library of pre-determined tools for decoder 330. Furthermore, memory 470, as well as configuration bitstream or bitstreams 471 supporting partial reconfiguration, of system 400 may all be on a single FPGA 100, and thus FPGA 100 would have internal access to the "static" part of the circuit for partial reconfiguration via an ICAP of a Xilinx FPGA for example. Notably, for a library of pre-determined tools, configuration information provided to FPGA 100 to partially reconfigure decoder 330 may include an index, such as a number or a name for example, to each decoding tool selected for the encoding of content to reduce the amount of information sent.

Decoder system 400 includes bitstream configuration module 460 and FPGA 100. Notably, for purposes of clarity, only a portion of computer system 304 of FIG. 3 is illustratively shown in FIG. 4; however, computer system 304 may be considered part of decoder system 400 or at least coupled to decoder system 400.

An extended bitstream, such as an extended bitstream 209 from bitstream generation system 200 of FIG. 2, may be provided to an optional decryption module 440 for decryption. Output of optional decryption module 440 may thus be extended bitstream 208.

Extended bitstream 208 may be provided to a data input port 312 of FPGA 100 and to a bitstream configuration module 460. For a compressed extended bitstream 208, bitstream configuration module 460 may be configured with an optional decompression capability for lossless decompression of a configuration bitstream of extended bitstream 208. Bitstream configuration module 460 may be configured to parse extended bitstream 208, after decompression if such decompression is used, to isolate configuration bitstream 204 for configuration port 311 of FPGA 100. Notably, even though encoded data, which may be compressed using a lossy compression, is provided as part of extended bitstream 208, this information may be ignored by bitstream configuration module 460. To identify such information to be ignored, conventional markers may be included in extended bitstream 208 to delineate the "payload", namely encoded data, whether compressed or not, from configuration data.

Configuration bitstream 204 is provided to configuration port 311 of FPGA 100. Such configuration port 311 may be a dynamic reconfiguration port for dynamically configuring decoder 330. For example, for FPGA 100 being an FPGA available from Xilinx, Inc. of San Jose, Calif., an ICAP port may be used for configuration port 311.

Notably, if compression is not used for configuration bitstream 204 from bitstream generator module 210 of FIG. 2, then configuration information may be provided directly to configuration port 311, and bitstream configuration module 460 may be included as part of FPGA 100 for partial reconfiguration of decoder 330. In an embodiment where encoded data, whether compressed or not, is provided to a configuration port of an FPGA, such as configuration port 311, conventional markers may be in the bitstream such that configuration port 311 ignores encoded data or compressed encoded data. However, as compression has been assumed, it shall be assumed that bitstream configuration module with optional decompression 460 is external to FPGA 100. Thus, configuration information from configuration bitstream 204 may be used to configure or reconfigure programmable logic 320 to provide decoder 330 for decoding encoded data in extended bitstream 208.

Along those lines, data input to data input port 312 is extended bitstream 208. Extended bitstream 208 may be buffered in input data buffer 313 coupled to data input port 312. It should be appreciated that there may be some time lapse during which FPGA 100 configures or reconfigures decoder 330. This amount of time is well within the time available for example for use of a video stream of 30 frames per second, namely approximately 1/30th of a second, for reconfiguration. However, real-time decoding or non-real-time decoding may be used. Furthermore, it should be appreciated that with respect to video, and more particularly MPEG video, there may be different types of information being sent in an sequence, such as I-frames, P-frames, and B-frames, as is known. Thus, while an I-frame is being processed, a circuit associated with processing a P-frame may be reconfigured. Moreover, while a B-frame is being processed, a circuit associated with processing a P-frame may be reconfigured, or some other permutation. In other words, it may be that decoder 330 may be partially reconfigured over one or more slices of time in order to reduce latency for such configuration or reconfiguration of decoder 330.

Data obtained from input data buffer 313 by decoder 330 may be decompressed by an optional decompression module 331. Again, continuing the above example of lossy compression, decompression module 331 would be configured to decompress according to the type of lossy compression used. Notably, it is well known to use headers or flags indicating the type of compression used for purposes of decompression, and accordingly such unnecessary detail is avoided for purposes of clarity.

Furthermore, it should be appreciated that in a video stream there are well-known markers that may be used to delineate decodable content from non-decodable content. For example, in an MPEG video stream, comments that are not part of what is decoded for output, such as for viewing on a display, may be inserted. Accordingly, such markers may be used to instruct circuitry to ignore configuration information, namely compressed configuration bitstream 206 of extended bitstream 208, when input to decoder 330. Input to decompression module 331 therefore may be limited to compressed encoded data 207. Decoder 330 only decodes encoded data after decompression by decompression module 331 to provide output data 402. Notably, output data 402 for lossy compression has some loss of information with reference to content data 202.

It has been assumed that the configuration information for configuring decoder 330 in programmable logic is associated with the type of encoding used. However, it should be appreciated that additional resources loaded as part of the configuration information may be used in configuring decoder 330 which would enhance the quality of the information provided, namely data 402, which may not be part of the encoding done by the encoder 220 of FIG. 2. For example, there are various known types of filtering to process information, in particular video information, to enhance the quality of such information. This filtering capability may or may not be implemented in a decoder. Thus, for example, depending on a performance level or level agreement between a user and a provider of such extended bitstreams, such enhancements may or may not be provided when configuring or reconfiguring decoder 330. Such a service or performance level, which terms are used herein interchangeably, may be associated with a set of one or more decoding related tools.

Although the example of MPEG has been used, it should be appreciated that any known video encoding format may be used, such as AVI, I-Video, Quicktime, or the like. With respect to audio, MP-3, I Tunes, MC, or the like may be used. With respect to pictures, JPEG, JPEG2000, Bitmaps, or the like may be used. Thus, it should be appreciated that any of a variety of known types of media or multimedia may be used provided such media use an encoding followed a decoding. Moreover, an extended bitstream may be used in applications other than media or multimedia applications, where encoding and decoding is used. Some examples include network communication, telecommunication, and other types of communication applications where a CODEC or coder/decoder pair is used.

While the foregoing describes exemplary embodiments in accordance with one or more aspects of the invention, other and further embodiments in accordance with the one or more aspects of the invention may be devised without departing from the scope thereof, which is determined by the claims that follow and equivalents thereof. Claims listing steps do not imply any order of the steps. Trademarks are the property of their respective owners.

What is claimed is:

1. A method for providing an extended bitstream for dynamically configuring a decoder, the method comprising:
    obtaining content data to be encoded;
    obtaining build settings for instantiating the decoder at least in part in programmable logic;
    encoding the content data with an encoder to provide encoded data;

generating a configuration bitstream for configuring the programmable logic responsive to the build settings; and combining the configuration bitstream with the encoded data to provide the extended bitstream, wherein the extended bitstream is self-contained to allow for configuring of the programmable logic to dynamically instantiate the decoder to decode the encoded data.

2. The method according to claim 1, wherein the configuration bitstream is for at least partial reconfiguration of the decoder instantiated at least in part in the programmable logic.

3. The method according to claim 1, wherein the configuration bitstream is for partial reconfiguration of the decoder instantiated at least in part in the programmable logic, the configuration bitstream including slot information for the partial reconfiguration thereof.

4. The method according to claim 1, wherein the encoder is customized to include at least one type of encoding component not part of a standards-based set of encoding.

5. The method according to claim 1, wherein the encoder is platform independent.

6. The method according to claim 1, further comprising:
compressing the configuration bitstream using a lossless compression to provide a compressed configuration bitstream; and
compressing the encoded data using a lossy compression to provide compressed encoded data,
wherein the combining is of the compressed configuration bitstream and the compressed encoded data to provide the extended bitstream.

7. The method according to claim 6, further comprising encrypting the extended bitstream.

8. The method according to claim 1, further comprising communicating the extended bitstream over a network.

9. The method according to claim 8, further comprising:
receiving the extended bitstream to an integrated circuit coupled to the network, the integrated circuit having the programmable logic;
parsing the extended bitstream to separate the encoded data from the configuration bitstream;
instantiating the configuration bitstream in the programmable logic to dynamically either configure or reconfigure the decoder to decode the encoded data; and
decoding the encoded data with the decoder instantiated responsive to the configuration bitstream.

10. The method according to claim 8, wherein the configuration bitstream is for a partial reconfiguration of the decoder, the decoder having been instantiated at least in part prior to receiving the configuration bitstream.

11. The method according to claim 8, wherein the configuration bitstream is associated in part with a service level for obtaining at least one decoding related tool associated therewith.

12. A method for on-demand providing of content, comprising:
selecting at least one first tool from a first library;
encoding content to provide encoded content, the encoding including use of the at least one first tool selected from the first library;
first generating a first bitstream having first configuration information for configuring programmable logic to decode the encoded content;
the first configuration information including at least a reference to the at least one first tool selected from the first library;

sending the first bitstream over a network to a user system, the user system including an integrated circuit having the programmable logic;
accessing at least one second tool selected from a second library by the integrated circuit, the at least one second tool being a duplicate of the at least one first tool;
at least partially reconfiguring a decoder instantiated in the programmable logic responsive to the at least one second tool selected from the second library; and
using the decoder to decode the encoded content.

13. The method according to claim 12, further comprising:
obtaining build settings for instantiating the decoder at least in part in the programmable logic;
second generating a second bitstream having second configuration information for configuring the programmable logic responsive to the build settings; and
combining the first bitstream and the second bitstream to provide an extended bitstream with the first configuration information and the second configuration information, wherein the first generating and the second generating are capable of being done in a single step for the combining thereof;
wherein the extended bitstream is self-contained to allow for at least partial reconfiguring of the programmable logic to dynamically instantiate the decoder to decode the encoded content.

14. The method according to claim 12, further comprising instantiating a base version of the decoder in the programmable logic of the integrated circuit prior to receiving the first bitstream by the integrated circuit.

15. The method according to claim 12, wherein the at least one first tool selected is associated with a service level.

16. The method according to claim 12, wherein the integrated circuit comprises a Field Programmable Gate Array.

17. A method for on-demand providing of content, comprising:
encoding content to provide encoded content, the encoding including use of the encoding settings;
obtaining build settings for instantiating a decoder at least in part in programmable logic, the build settings being for the encoding settings;
generating a configuration bitstream for configuring the programmable logic responsive to the build settings;
sending the configuration bitstream over a network to a user system, the user system including an integrated circuit having the programmable logic;
at least partially reconfiguring a decoder instantiated in the programmable logic responsive to the configuration bitstream; and
using the decoder to decode the encoded content.

18. The method according to claim 17, wherein the build settings include at least in part a selection reference to at least one tool from a library for MPEG Reconfigurable Video Coding.

19. The method according to claim 18, further comprising providing the encoded content over the network to the user system as part of a live feed.

20. The method according to claim 18, further comprising:
combining the encoded content and the configuration bitstream to provide an extended bitstream; and
sending extended bitstream over the network to the user system.

* * * * *